United States Patent [19]

Yamaguchi

[11] Patent Number: 4,742,516

[45] Date of Patent: May 3, 1988

[54] METHOD FOR TRANSMITTING VOICE INFORMATION

[75] Inventor: Mikio Yamaguchi, Osaka, Japan

[73] Assignee: Sumitomo Electric Industries, Ltd., Osaka, Japan

[21] Appl. No.: 817,603

[22] Filed: Jan. 10, 1986

[30] Foreign Application Priority Data

Jan. 14, 1985 [JP] Japan .................................... 60-3228
Jun. 13, 1985 [JP] Japan ................................ 60-129018

[51] Int. Cl.[4] ............................ H04J 3/24; G08B 5/22

[52] U.S. Cl. .................................. 370/94; 340/825.44

[58] Field of Search ............................ 370/60, 94, 99; 455/156, 158; 340/825.44, 311.1

[56] References Cited

U.S. PATENT DOCUMENTS

| | | | |
|---|---|---|---|
| 4,477,807 | 10/1984 | Nakajima et al. | 340/825.44 |
| 4,480,253 | 10/1984 | Anderson | 340/825.44 |
| 4,516,239 | 5/1985 | Mayemchuk | 370/94 |
| 4,517,669 | 5/1985 | Freeburg et al. | 370/94 |
| 4,519,068 | 5/1985 | Krebs et al. | 370/94 |
| 4,551,834 | 11/1985 | Liéward | 370/94 |
| 4,601,586 | 7/1986 | Bahr et al. | 370/94 |

OTHER PUBLICATIONS

"Portable computer & host talk over radio-frequency link" by Jay Krebs-Electronics/Aug. 25, 1983, pp. 142-145.

*Primary Examiner*—Douglas W. Olms
*Assistant Examiner*—Frank M. Scutch, III
*Attorney, Agent, or Firm*—Cushman, Darby & Cushman

[57] ABSTRACT

A system including a broadcasting station which transmits many independent information packets to many receiving sets in succession. An information packet consists of a text, a classification code and a distinction code. Text is a sequence of words and symbols which may be converted into voice. Classification codes specify the substance of text, distinction code is annexed to each different text for distinguishing that type of text from other texts. A receiving set with registered classification codes selects and accumulates only necessary information packets by comparing the transmitted classification codes with stored codes. If the codes match, the text is stored so that the receiver can playback the voice information at a convenient later time.

27 Claims, 4 Drawing Sheets

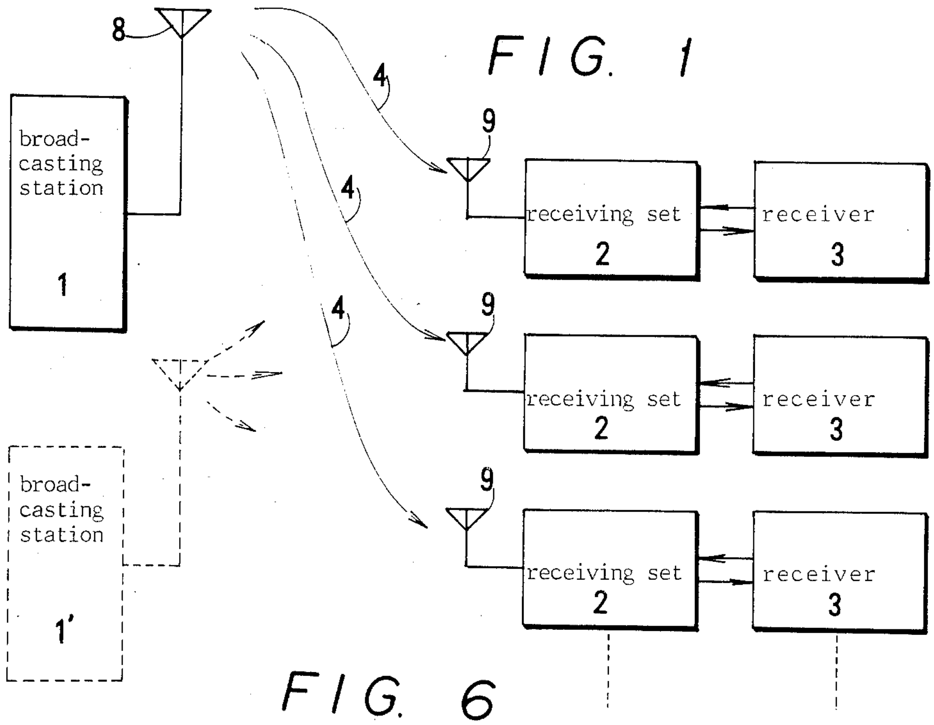
FIG. 1
FIG. 6
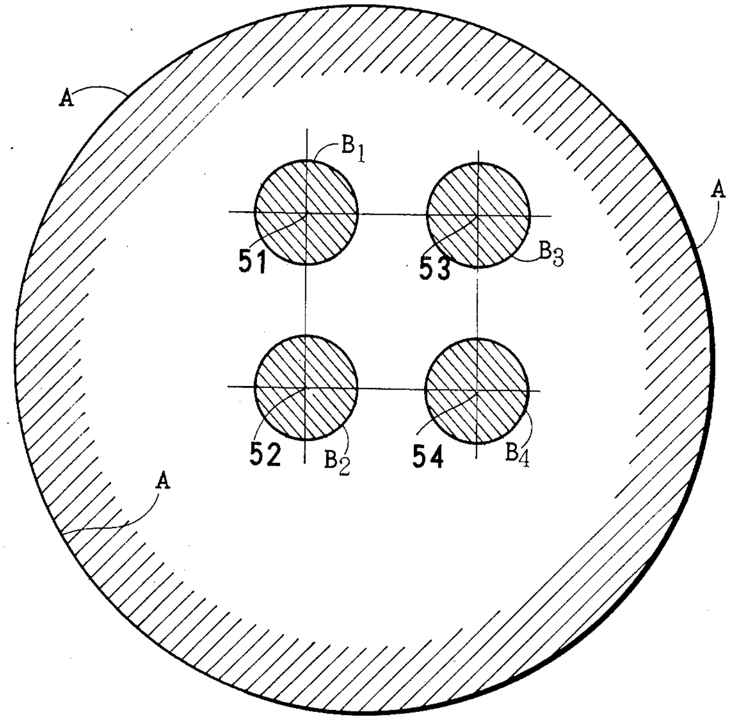

METHOD FOR TRANSMITTING VOICE INFORMATION

BACKGROUND OF THE INVENTION

This invention relates to a method for transmitting voice information which enables the transmission of much voice information with a high efficiency.

Radio broadcasts are popular media for transmitting voice information to many anonymous people. Radio broadcasting connects several radio stations with many receivers, with each radio station monopolizing one frequency of carrier wave. A receiver can select an arbitrary radio station by tuning his radio dial to the frequency.

Voices are generated from the receiver's speaker continuously, for the receiver cannot know the substance of the earlier received voice information. He or she may miss hearing necessary information, unless he or she is listening at all times to the radio. Also, since one radio station sends various kinds of information, a choice of a broadcasting station is not equivalent to a choice of the substance of information received. It is the radio station that determines what kinds of information will be sent. Consequently, a receiver has the freedom to determine whether he will hear the radio or not and the freedom to choose a particular radio station; however, a receiver has no freedom to determine what substance of information he will hear.

Conventional radio broadcasts also have the following problems:

(1) Nobody can select and hear only the information he or she requires. For example, a stock price of a certain company in the stock market cannot be heard at an arbitary time.

(2) A radio receiver set receives an electric wave and converts it to voice without time delay, time shrinkage or time expansion. Thus, one must hear the radio in accordance with the broadcasted program.

(3) One frequency of carrier wave cannot be shared in time (e.g., each frequeny being transmitted several tens of seconds) with plural radio stations, because each radio station must continuously use its assigned frequency at all times.

SUMMARY OF THE INVENTION

A purpose of the invention is to provide a method for transmitting voice information which enables a receiver to select and hear only necessary information.

Another purpose of the invention is to provide a method for transmitting voice information which enables a receiver to hear the necessary information at a selected convenient time.

A third purpose of the invention is to provide a method for transmitting voice information which enables plural broadcasting stations to use a single frequency of carrier wave in common by sharing the broadcasting time.

A fourth purpose of the invention is to provide a method for transmitting voice information which enables much voice information to be sent to many anonymous people with a restricted transmitting capacity (e.g., a frequency band of carrier wave).

A fifth purpose of the invention is to provide a method for transmitting voice information which enables a broadcasting station to send various types of substantial information.

A sixth purpose of the invention is to provide a method which enables a receiver to hear his or her necessary information without fail.

For the above purposes, this invention provides a new method for connecting a broadcasting station with many receiving sets. The broadcasting station transmits many "information packets" in succession, the word "information packet" being used by this Inventor to designate a packet consisting of a classification code, a distinction code and a text. The classification code is a code for classifying the substance of a text. A distinction code is a code which is annexed to each different text to distinguish each text, and the text is one or a few short sentences comprising words, symbols or numerals which represent voice information.

In accordance with the present invention, many kinds of information packets will be sent. All such information packets are independent in substance and are sent in succession. It is unimportant whether an information packet is relevant to the next information packet or not. Also, unlike radio broadcasts, the transmitted information packets have no continual substances. A receiver need not hear the sequences of information packets, for this invention requires no continuous listening on the receivers' sides.

One information packet may be repeatedly transmitted. At a receiving set, one or a few classification codes are designated beforehand. The receiving set thus selects only the information packets with a classification code which is the same as one of the designated codes and ignores the other information packets. Also, in the selected information packets, information packets with a distinction code which is the same as one of the distinction codes of the accumulated information packets are abandoned. The receiving set searches such information packets which have the designated classification codes and the distinction codes other than that of preaccumulated ones, and accumulates them into an accumulator. A receiver thus can hear the necessary voice information by converting the accumulated texts into voice at some convenient time.

Three elements of an information packet of the present invention will be explained.

(i) classification code:

This is a code which signifies the substance of text. Information to be transmitted relates to weather forecasts, stock market prices, traffic status, etc. Furthermore, these kinds of information are subdivided. For example, the weather forecast is subdivided by districts and times, the stock market prices are subdivided into stock prices of each corporation and the traffic status is subdivided into the traffic jam information at each main street or each main cross point.

All individual items of information are provided with their own classification codes. A broadcasting station transmits many information packets with various such classification codes. However, a receiving set designates only one or a few classification codes. For example, a particular receiving set may select only the information of weather forecasts, whereas another one may select only the information relating to local traffic status. However, it is also possible for a receiving set to change the designation of the classification codes.

A classification code consists of a symbol signifying a classification code and a sequence of numerals. For example, a classification code is represented by a slash symbol "/" and ten numerals succeeding the "/".

| | |
|---|---|
| /0000010034 | traffic status at Midosuji Street |
| /0000010100 | traffic status at Pacific Street |
| /0012000000 | general weather forecast in Japan |
| /0012000100 | weather forecast in New York |

where slash "/" signifies a classification code.

With regard to traffic status information, either wide-range information or narrow-range information, e.g., at Midosuji Street or at some spot of Midosuji Street may be designated by the classification codes. Similarly, with regard to a weather forecast, either whole national or local weather forecasts may be selected by the classification codes. Also, regarding stock market prices, either whole stock prices or a stock price of a certain corporation may be selected. These designations are done using classification codes.

(ii) distinction code:

This is a code annexed to each different text. The function of the code is to distinguish different texts or equivalent texts and to prevent two equivalent texts from being accumulated doubly at a receiving set. Because the function of the code is to distinguish texts, the distinction codes may be only a series of numbers. However, another choice of distinction codes is possible, as will be explained below.

A distinction code comprises the year, month, date, o'clock and minute of the time when the text is drawn, the number of times of transmission and the time of transmission. A distinction code also consists of a symbol signifying a distinction code, e.g., a yen symbol " " and a sequence of sixteen numerals succeeding the symbol. " ", "|" or " " is also available instead of " ".

For example, 8412041034011102 may be transmitted. This signifies that this text has been drawn at 34 minutes past 10 o'clock on the 4th day of December, 1984, that this is the first time of transmission and that the transmission time is 2 minutes past 11 o'clock. " " is a symbol for distinguishing it as a distinction code.

As another example, 8412041343031705 signifies that this text has been drawn at 43 minutes past 13 o'clock on the 4th day of December, 1984, that this is the third time of transmission and that the transmission time is 5 minutes past 17 o'clock.

(iii) test:

This is a part which will become voice information. A text is a sequence of words, numerals and symbols which can be converted into voice by a text-to-speech synthesizer. For example, "at Δ the Δ midosuji street, the Δ lane Δ toward Δ the Δ north Δ is Δ being jammed." This is a sequence of the square forms of Japanese syllabary, comma, period and an accent symbol . The sequence of words and symbols shall be converted into voice by a text-to-speech synthesizer.

A text may be a sequence of words and symbols which consist of the square forms of Japanese syllabary, Chinese characters, comma, period, alphabets, pronunciation symbols, numerals, an accent symbol and a blank symbol. In this case a word cannot be represented by a digital signal of eight bits. However, a text may be represented by a more restricted scope of words. For example, a text may be constituted by the sentences consisting of the square forms of Japanese syllabary, comma, period, alphabets, numerals, an accent symbol and a blank symbol.

The square forms of Japanese syllabary have about 50 words. The alphabets have 26 words, because the texts require no difference between capital letters and small letters. The numerals have 10 words. Thus, each word or symbol can be represented by a digital signal of seven bits, because the number of whole usable words and symbols is less than 128 (7 bits). A word or symbol can be also represented by a digital signal of eight bits which allows room for increasing the number of usable words or symbols.

As another example, "we Δ will Δ tell Δ weather forecast. western Δ japan is Δ being Δ covered Δ by" (the rest is omitted), where Δ is a blank symbol.

The two examples above-mentioned are the sentences originally written in Japanese. Other examples which are originally written in English will be explained.

"This is a weather forecast of the New York area. It will be fine in the morning, but will rain in the afternoon."

Because the example is written in English, no accent symbols or blank symbols are necessary. Ordinary written English thus can be converted by a synthesizer, which will be described below.

"The Pacific Street is now under construction. If you will go to the New York Station, pass through the East Street instead of the Pacific Street."

So far a classification code, a distinction code and a text have been explained. The sequence of transmission is a classification code, a distinction code and a text, respectively, or a distinction code, a classification code and a text, respectively.

One information packet is constructed with the three elements. Examples will be explained below:

<example 1>: traffic status information /0000010034 8412041034011102 at Δ the Δ midosuji street, the Δ lane Δ toward Δ the Δ north Δ is Δ being jammed.

In this example, the classification code /0000010034 signifies that the substance of the text relates to the traffic status information at Midosuji Street. The distinction code signifies that the text has been drawn at 34 minutes past 10 o'clock on the 4th day of December, 1984, that this is the first time of transmission and that the time of transmission is 2 minutes past 11 o'clock. The text tells that the lane toward the north is jammed at the Midosuji Street. Only this part shall be expressed by voice at a receiving set.

<example 2>: weather forecast in Japan /0012000000 8412041343031705 we Δ will Δ tell Δ weather forecast. western Δ japan is Δ being Δ covered Δ by (the rest is omitted).

In this example, the classification code /0012000000 signifies that the text relates to the weather forecast. The distinction code shows that the text has been drawn at 43 minutes past 13 o'clock on the 4th day of December, 1984, that this is the third time of transmission and that the time of transmission is 5 minutes past 17 o'clock.

<example 3>: weather forecast in New York /0012000100 8411030735040730 This is a weather forecast of the New York area. It will be fine in the morning, but will rain in the afternoon.

The classification code /0012000100 signifies that the text relates to the weather forecast in the New York area. The distinction code shows that the text has been drawn at 35 minutes past seven o'clock on the 3rd day of November, 1984, that this is the fourth time of transmission and that the time of transmission is 30 minutes past 7 o'clock.

<example 4>: traffic status information /0000010100 8408050445011716 The Pacific Street is now under construction. If you will go to the New York Station, pass through the East Street instead of the Pacific Street.

Information packets may be simplified. Simplified versions of information packets will be explained below.

A simplified information packet consists only of a classification code and a text. A distinction code is omitted. For example:

<example 5>: traffic status information /0000010034 at Δ the Δ midosuji Δ street, the lane Δ toward Δ the Δ north Δ is Δ being jammed.

<example 6>: weather forecast /0012000000 we Δ will Δ tell Δ weather ∇ forecast. western Δ japan is Δ being Δ covered Δ by (the rest is omitted).

Because the simplified information packet lacks the distinction code, the operation for drawing texts is simplified. However, this version of information packets could not avoid double accumulation at receiving sets if the same information packet was sent more than once. Each information packet thus shall be sent only once in case of this simplified broadcasting.

BRIEF DESCRIPTION OF THE DRAWINGS

FIG. 1 is a schematical view of this invention in the case of application to wireless broadcasting.

FIG. 6 is a schematical view of broadcasting areas in the case of time-sharing broadcastings with wide broadcasting and narrow broadcasting.

DETAILED DESCRIPTION OF THE INVENTION

Figure 2:
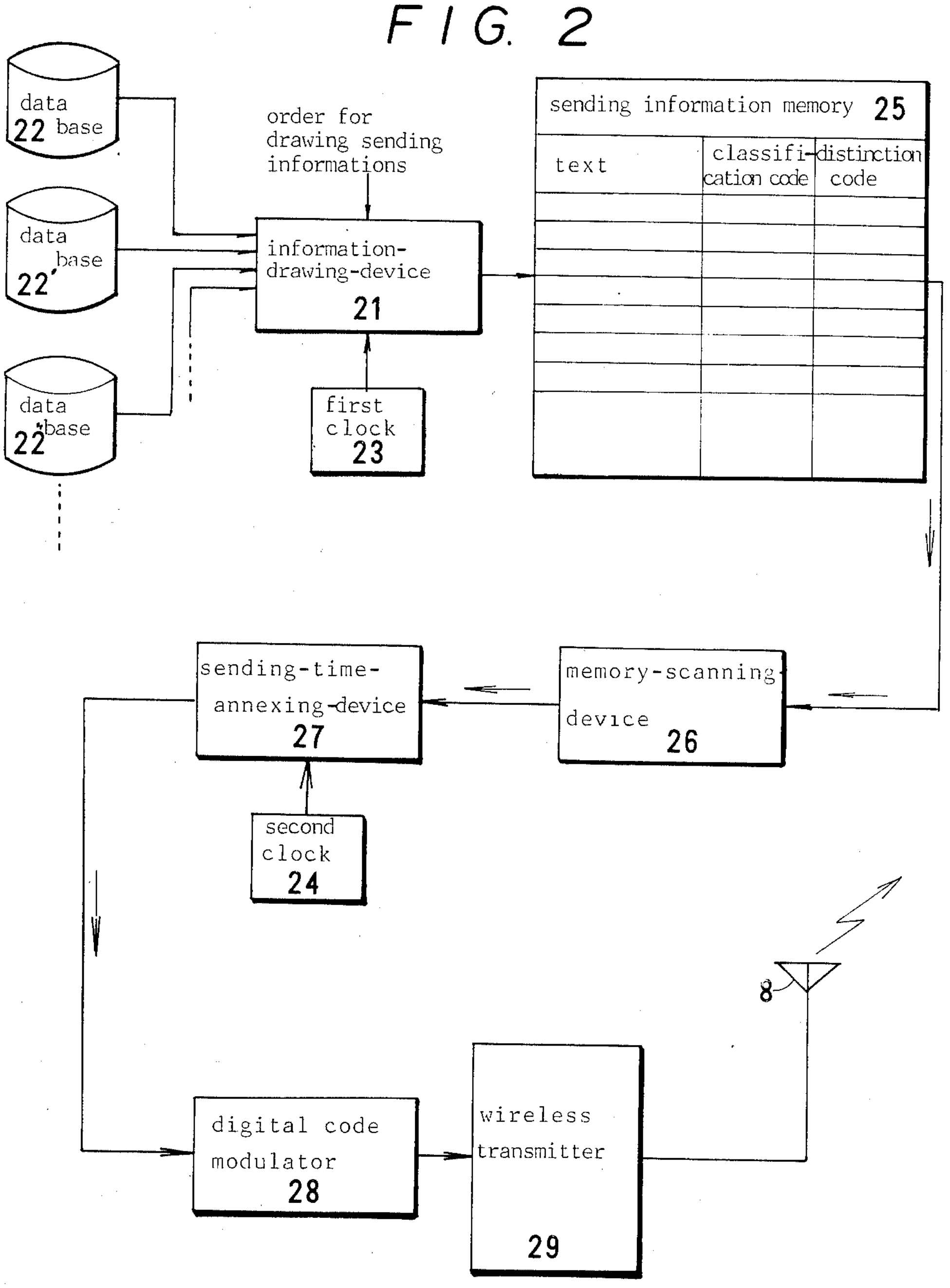
FIG. 2 is a schematical view of the structures of a broadcasting station.

FIG. 1 shows a broadcasting station(s) and receiving sets in accordance with the present invention.

There may be a single broadcasting station (1) or there may be more than one. If there are plural broadcasting stations, they transmit information packets by time-sharing a common transmission medium.

There are many receiving sets (2). A receiver (3) corresponds to each receiving set (2). The receiver (3) can operate the receiving set (2), but there is no need for the receiver (3) to stay near the receiving set (2) or be in operation at all times.

A transmission medium (4) connects the broadcasting station(s) (1) with many receiving sets (2). The transmission medium may be either wire cables or wireless, electric waves. In the case of wire cables, both an electric cable and an optical fiber cable are available. In the case of the electric cable, either telephone circuits or dedicated lines are available.

In the case of wireless transmission, a carrier wave of an adequate frequency will be used as a transmission medium. Any frequency between hundreds of kHz and hundreds of MHz is available for such transmission.

FIG. 1 shows an example which uses an electric wave as a transmission medium. The carrier wave is sent from antenna(s) (8) of the broadcasting station(s) (1) and is received by antennas (9) of the receiving sets (2). The detailed structures of the broadcasting station and the receiving sets will be explained below with reference to FIGS. 2 and 3.

FIG. 2 shows the schematic structure of a broadcasting station in accordance with the present invention.

All information may be accumulated in a data base (22), a data base (22') and so on. The data bases are, e.g., a data base of weather information at the Meteorological Agency, a data base of traffic information at police stations or a data base of stock prices at the stockmarket. A sender gives an order for drawing sending information from the data base to an information-drawing-device (21).

According to the order for drawing, the information-drawing-device (21) extracts necessary information from the data bases (22), (22'), . . . , designates a classification code and annexes a distinction code. Because a distinction code must include the time of drawing the text, a first clock (23) supplies the time of drawing to the information-drawing-device (21). The time of drawing thus becomes a part of the distinction code.

For example, if information relating to a weather forecast shall be sent, the information-drawing-device (21) refers to the data base at the Meteorological Agency and obtains one or a few sentences regarding the weather forecast. The sentences become a text. The text will be designated with a classification code and be annexed with a distinction code.

Because the classification code shows the substance of text, it is designated by the data base. The nationwide weather forecast or the local weather forecasts of certain districts have designated classification codes. Then, the predesignated classification codes corresponding to the substance of a text is given to the text. However, although a distinction code consists of the year, month, day, o'clock and minute of the time of drawing, the number of times of transmission and the time of transmission, the information-drawing-device (21) annexes only the time of drawing, because other items are unknown then.

The information-drawing-device (21) draws an information packet with a text, a classification code and a distinction code and writes it in a sending information memory (25). Many information packets are written into the sending information memory (25).

A text is composed of words and symbols. Words can be converted into a digital signal of, e.g., seven bits or eight bits. Slash,    , comma, period, Δ,    or other symbols also can be converted into a digital signal of, e.g., seven or eight bits. This conversion from words to digital signals has already been standardized by the Japanese Industrial Standard (JIS). In the case of digital signals of eight bits, the slash "/" has been determined to be 00101111 and "    " has been determined to be 01011100. In a similar manner, words have prescribed equivalences of digital representation.

According to the conversion rule, any information packet can be replaced by a sequence of digital signals. Because the information packet has been converted into a sequence of digital signals, the sending information memory (25) can memorize the information packet. If convenient memories with seven bits or eight bits have been chosen, each word, symbol or numeral can be memorized by a unit of the memory device, for it is a well-known matter to accumulate words, etc., into a memory device in the form of a digital signal.

After scanning the sending information memolry (25), a memory-scanning-device (26) reads out information packets and sends them to a sending-time-annexing-device (27). The number of times of transmission is then added to the distinction code. The sending-time-annexing-device (27) annexes the time of transmission given by a second clock (24) to the distinction code. At this time a distinction code is completed. The sending-time-annexing-device (27) sends the completed information packet to a digital code modulator (28). Each information packet consisting of a classification code, a distinction code and a text is then converted into analog signals in succession by the digital code modulator (28).

The reason why the digital signal representative of information packets should be converted into analog signals is that the information packets shall be transmitted by electric (wireless) wave in the embodiment of FIG. 2. However, in case electric wire cables or optical fiber cables are used as transmission media, the digital signals can be transmitted without the conversion to analog signals.

In the case of wireless (electric wave) transmission, a carrier wave with a certain frequency is required. The sequence of digital signals of the information packets are modulated onto the carrier wave by amplitude (AM) or frequency (FM) modulation of the carrier wave. For example, the digital signal "0" may correspond to a 2100 Hz modulation wave, and the digital signal "1" may correspond to a 1300 Hz modulation wave. The length of a modulation wave may be several tenths of a millisecond to several milliseconds. This manner of modulation is well known, and other manners of modulation are also available. Also, the transmission medium may be either electric cables, optical cables or electric waves.

Voice consists of vibrations between several tons of Hz and several thousands of Hz. In case of radio broadcasting, the amplitude (AM) or the frequency (FM) of the carrier wave is modulated by the vibrations. A receiving set receives the electric wave, demodulates it and drives a speaker. Thus, the velocity for transmitting voice information is restricted by the audibility of man as well as by the velocity of speech in radio broadcasting.

In any case, voice is not transmitted unchanged. The words and symbols are converted to sequences of digital representations "0" and "1" and are transmitted in the form of digital signals. In this invention, the words and symbols and voice information are converted to digital signals of, e.g., eight bits, and are transmitted by a cable or by a carrier wave modulated by the digital signals. The velocity for transmitting the voice information is not restricted by the audibility of man or by the velocity of speech. High transmission velocity of this invention enables the transmission capacity to be enlarged to a great extent.

If voice vibrations were modulated according to pulse coded modulation (PCM), however, it should be totally impossible to convert the voice vibrations corresponding to a single word to a digital signal of eight bits. Instead of voice vibration, a sequence of words and symbols and voice information is transmitted substantially as a digital signal. This manner of transmission enables a restricted transmission medium to transmit a lot of information in a short time.

In case of a wireless transmission, an electric wave with a certain frequency is used as a carrier wave. Then the digital signals must be converted to analog signals. For example, the conversion may be done by changing the frequency of the modulation wave which modulates the carrier wave. Although such a modulation converts digital signals into analog waves, the modulation totally differs from the A/D conversion or D/A conversion of numerical values.

The electric wave modulated by the information packets is generated by a wireless transmitter (29) and is radiated from an antenna (8). Because the sending information memory (25) is scanned in turn, the accumulated information packets are transmitted in succession. Also, each text accumulated in the sending information memory (25) represents independent information irrelevant to the neighboring texts. Because independent short information is transmitted in succession, receivers need not hear the transmitted information continuously. Continuous receiving is totally unnecessary when the data packets are used, unlike in radio broadcasting.

The structure of a receiving set will now be explained.

Even if there is only a single broadcasting station, there are a lot of receiving sets. A receiving set receives all information packets but disregards unnecessary ones and accumulates only necessary information packets. A receiver is able to hear the accumulated information by converting the texts of information packets into voice at a convenient time.

Figure 3:
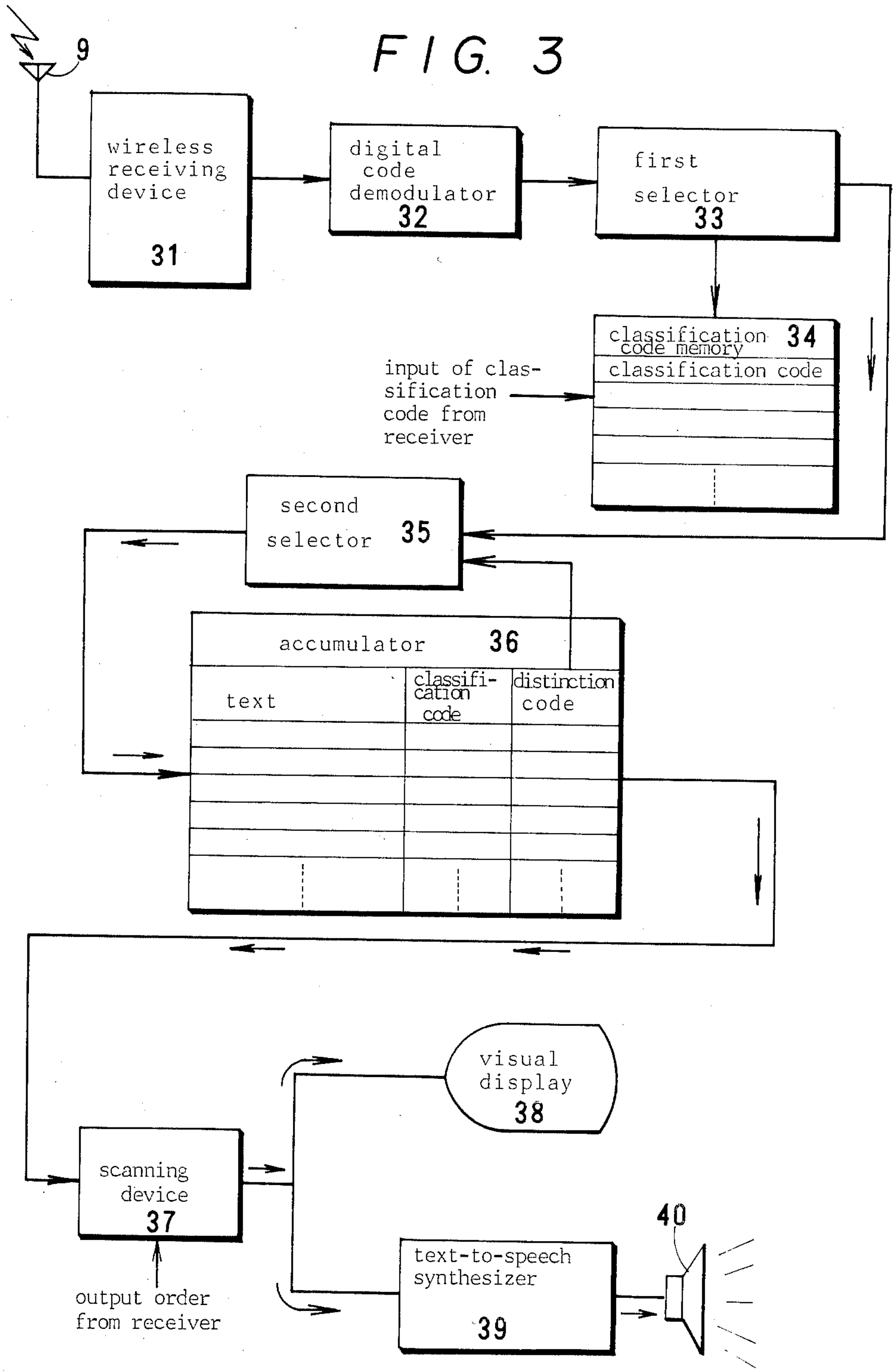
FIG. 3 is a schematical view of the structures of a receiving set.

FIG. 3 shows the structure of a receiving set in accordance with the present invention.

An antenna (9) catches the electric wave transmitted from the broadcasting station. A wireless receiving device (31) tuned to the broadcasting station receives a carrier wave of predetermined frequency, amplifies the wave and demodulates it to obtain analog signals corresponding to the digital signals of the information packets. A digital code demodulator (32) then demodulates the analog signals into the digital signals, which are the information packets consisting of classification codes, distinction codes and texts.

The receiver has already registered the classification code(s) of information packets which he or she wants to hear in a classification code memory (34) of the receiver set. A first selector (33) thus compares the classification codes of received information packets with the classification code(s) registered in the classification code memory (34) in succession. If there is no registered classification code(s) common with the classification code of a received information packet, this information packet is not one which the receiver wants to hear. Therefore, the selector (33) disregards the information packet. However, if the classification code of a received information packet coincides with any one of the registered classification codes, the selector (33) sends the information packet to a second selector (35).

The second selector (35) compares the distinction codes of received information packets with the distinction codes of the information packets accumulated in an accumulator (36) in succession. If one of the accumulated information packets has a distinction code that is the same as that of an already received information packet, it means that an information packet the same as the received information packet has been accumulated in the accumulator (36). In this case, the received information packet is unnecessary; therefore, the second selector (35) disregards the received information packet because it is unnecessary to accumulate the same text more than once.

If the accumulator (36) does not have a distinction code that is the same as the distinction code of the received information code, the information packet has never been accumulated in the accumulator (36). Then the second selector (35) sends the information packet into the accumulator (36), which memorizes the classification code, distinction code and text of the information packet. However, the second selector (35) compares only the parts of the distinction code which are required to identify texts. Namely, only the parts of the year, month, day, o'clock, and minute of drawing the text in a distinction code are compared. Neither the number of transmissions nor the time of transmission is compared, because there are not two different information packets having the same number of transmissions and the same time of transmission.

This selection is required because the same information packets are transmitted repeatedly at different times. If two information packets are equivalent, the numbers of transmissions and the times of transmission must be different. Then the difference of the number of transmissions or the times of transmission does not means that two information packets are different.

The reason why the same information packets are repeatedly transmitted is partly because the substance of texts need not be changed between transmissions. It is also partly because the receiving sets sometimes may misreceive a necessary information packet, and it is partly because the switch of a receiving set may be sometimes turned off when a necessary information packet is transmitted initially.

In the following manner the accumulator (36) accumulates the information packets with classification codes, distinction codes and texts.

A receiver gives the receiving set an output order at his or her convenient time by turning on some switch. According to the output order from the receiver, a scanning device (37) reads out the texts accumulated in the accumulator (36) in succession. Only the texts are read out. Neither classification codes nor distinction codes are read out.

The texts read out are sent to either or both of a visual display (38) and a text-to-speech synthesizer (39). The visual display (38) is an apparatus for representing information by words and symbols. For example, a CRT (Cathode Ray Tube) display is available for this purpose. The visual display (38) is effective for a receiver with weak reception or under very noisy transmission circumstances.

The text-to-speech synthesizer (39), on the other hand, is a device to convert the words and symbols of texts into voice. In case of texts written in English, the synthesizer modules may use the techniques of "DEC talk" of DEC corporation in the U.S.A. or "PROSE 2000" of SPEECH corporation in the U.S.A., for example. The texts converted to voice are spoken out of a speaker (40). A receiver can thus receive the texts by listening. The comprehension by hearing is advantageous, for it is inconvenient for a receiver to see the visual display, e.g., when the receiver is at work or is driving a car.

There is no problem if a single classification code is registered at a receiving set. No inconvenience occurs when the scanning device (37) scans the accumulator (36), because in such a case all voice information is relevant to other voice information. However, if more than one classification code is registered in the receiving set, information packets with different classification codes are arranged randomly in the accumulator (36). Because the accumulator (36) is being scanned in succession, the texts of different classification codes are being spoken in turn. It is uncomfortable, therefore, because the speech lacks coherence. Furthermore, even if a receiver has registered more than one classification code, the receiver sometimes may want to hear only the texts with a certain classification code. In this case it is desirable to improve the receiving set. In the improved receiving set, the receiver is able to designate a classification code among the plural registered classification codes by specifying the output order. When the receiver gives the output order as well as the designation order of a single classification code, for example, the scanning device (37) reads out only the texts with the designated code. Thus, the receiver hears only the texts with the same classification code.

As mentioned before, another simplified form of an information packet is possible in this invention. In the simplified form, an information packet consists of a classification code and a text only. A distinction code is omitted. Each information packet thus is sent only once.

This simplified method for transmitting voice information in accordance with the invention will be explained with reference to FIG. 4 and FIG. 5.

Figure 4:
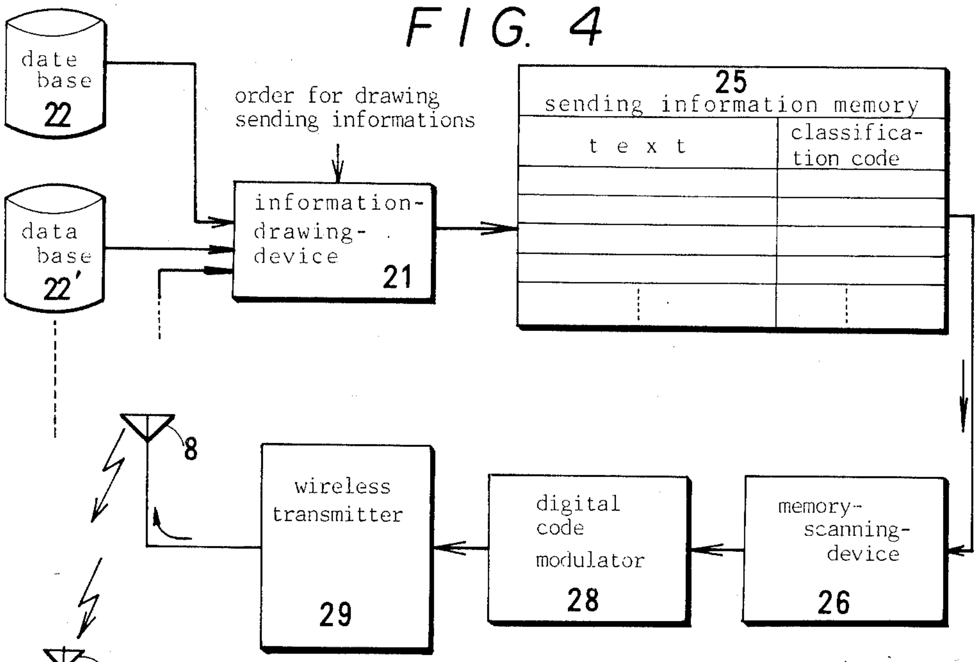
FIG. 4 is a schematical view of the simplified structures of a broadcasting station.

FIG. 4 shows the structure of a broadcasting station which lacks the clocks (23) and (24) and the sending-time-annexing-device (27) in FIG. 2. All information is accumulated in data bases (22), (22'), . . . , and so on as previously, and as before, a sender gives an order for drawing sending information to an information-drawing-device (21). According to the order for drawing, the information-drawing-device (21) extracts necessary information from the data bases (22), (22'), . . . and designates a classification code. Because the classification code shows the substance of the text, it will be designated according to the nature of the data base from which the text has been extracted. The information-drawing-device (21) completes an information packet only with a text and a classification code and writes it in sending information memory (25). Many simplified information packets may thus be written into the sending information memory (25).

A text is composed with words (including numerals) and symbols. The text can be converted into a digital signal of, e.g., seven bits or eight bits according to the conversion rule. In the data bases the words and symbols have been written as a digital signal, and according to the conversion rule, any information packet can be replaced by a sequence of digital signals.

After scanning the sending information memory (25), a memory-scanning-device (26) reads out information packets and sends them to a digital code modulator (28). Each information packet consisting of a classification code and a text is converted into analog signals in succession by the digital code modulator (28). A carrier wave with a predetermined frequency then is modulated by the analog signals which correspond to the information packet. A wireless transmitter (29) radiates the strong carrier wave modulated by the information packet from an antenna (8).

Figure 5:
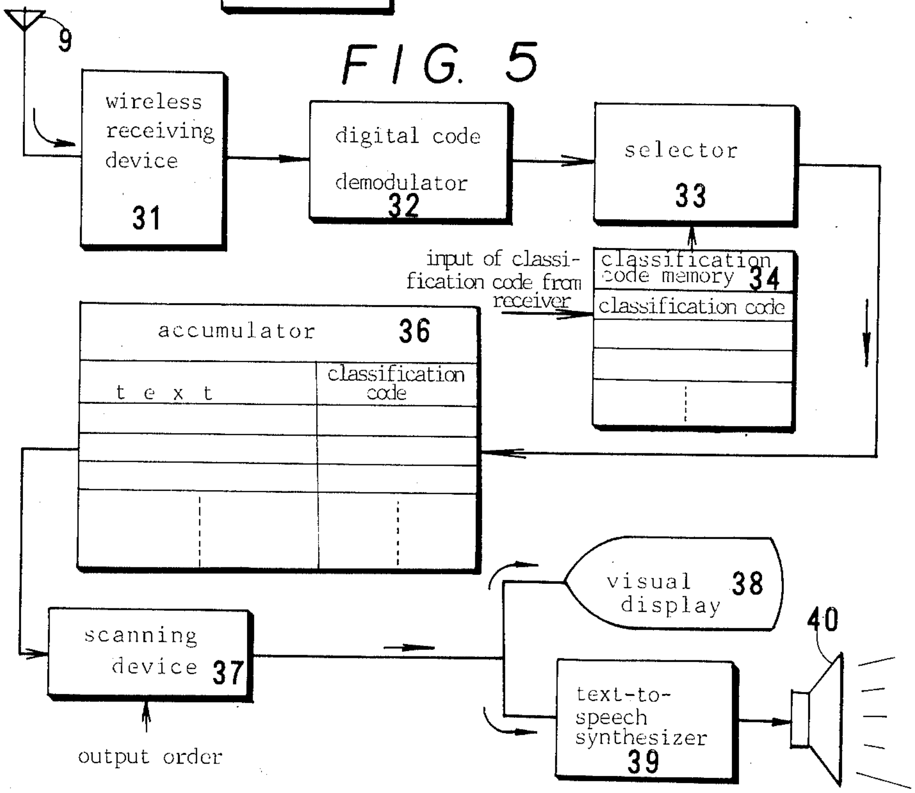
FIG. 5 is a schematical view of the simplified structures of a receiving set.

FIG. 5 shows the structure of a simplified receiving set.

An antenna (9) receives the electric wave transmitted from the broadcasting station. A wireless receiving device (31) chooses a carrier wave of a predetermined frequency, amplifies the wave and obtains analog signals, the carrier wave corresponding to that modulated by the digital signals representing the information packets. A digital code demodulator (32) then demodulates the analog signals into the digital signals representing the information packets. As noted above, the information packet consists only of a classification code and a text.

The receiver has already registered the classification code(s) of the information packet which the receiver wants to hear in a classification code memory (34). A selector (33) compares the classification codes of received information packets with the classification code(s) registered in the classification code memory (34) in succession. If there is no registered classification code(s) common with the classification code of a received information packet, the selector (33) disregards the information packet. However, if the classification code of a received information packet coincides with any one of the registered classification codes, the selector (33) sends the information packet to an accumulator (36). The accumulator (36) accumulates the information packets with classification codes and texts in succession.

A receiver gives the receiving set an output order at a convenient time by turning on some switch. According to the output order from the receiver, a scanning device (37) then reads out the texts accumulated in the accumulator (36) in succession.

The texts read out are sent to either or both of a visual display (38) and a text-to-speech synthesizer (39). As noted above, the visual display (38) is an apparatus for representing information by words and symbols. The text-to-speech synthesizer (39) is a device for converting the words and symbols of text into voice which is heard from speaker (40).

In this invention, various kinds of voice information are transmitted discontinuously as information packets. All information packets are independent, and an information packet is irrelevant with respect to the neighboring ones.

Each receiving set accumulates some of the information packets, and a receiver can hear the voice information at any time after the transmission. Also, there is no requirement to transmit voice information continuously without pause from a broadcasting station. Therefore, this invention enables more than one broadcasting station to transmit different kinds of information by sharing the transmitting time. This is called time-sharing broadcasting.

FIG. 6 shows the broadcasting areas in the case of time-sharing broadcasting for wide broadcasting and narrow broadcasting.

A unit period of time is divided. For example, a transmitting time unit of one minute is divided into a 45 seconds subperiod and a 15 seconds subperiod. For each earlier 45 seconds subperiod, a big broadcasting station transmits nation-wide programs to a wide broadcasting area (A) with a strong electric wave. For each subsequent 15 seconds subperiod, small local broadcasting stations may transmit local information for the small areas $B_1$, $B_2$ . . . from many automatic transmitters by weak electric waves. The electric waves propagate only within the small areas $B_1$, $B_2$, . . . . The information may thus represent local information such as traffic status of streets or cross points. For example, the automatic transmitters may be located at cross points 51, 52, . . . of streets. They radiate electric waves without an operator.

There may be two broadcasting stations with the same carrier wave in some areas. Furthermore, more than two broadcasting stations may be installed in the same areas. However, because the frequency of the carrier wave is common, the plural broadcasting stations require no more than one frequency.

The advantages of the present invention now will be explained.

(1) This invention enables a receiver to hear only necessary voice information by an automatic selection of the receiving set. Unnecessary information is not heard so that the receiver can save time and alleviate the necessity of listening to undesired information.

(2) A receiver can hear only necessary information at an arbitrary and convenient time.

(3) Without manual operation, the broadcasting station can convert the information stored in computers to information packets and can transmit them automatically. Input of information requires neither manual operations nor speeches by announcers before microphones. The broadcasting processes thus can be automated, because nobody need read aloud texts.

(4) Enormous amounts of information can be transmitted in a short time, because the broadcasting station transmits not voices but digital data which is later converted to voices.

If voice vibration is transmitted as PCM (Pulse Code Modulation) signals, the amount of information is 56 kbit/sec in case of a normal rate of speech. This is a large amount of information. It is available because the voice vibration is directly sampled in a PCM manner.

In this invention, the amount of information is about 80 bits/sec in the case of a normal rate of speech, because each word or symbol is transmitted as a digital signal of seven or eight bits. Moreover, this invention requires a very small information capacity, about one seven-hundredth of that of the PCM voice transmission.

Namely, this invention enables the broadcasting stations to transmit much information in a short time. High efficiency of transmission is thus an advantage of this invention, and this invention is greatly superior to radio broadcasts regarding the efficiency of transmission.

(5) Because much information can be transmitted, the transmitted information can be affluent and varied in substance.

(6) Plural broadcasting stations can use carrier waves with the same frequency by sharing transmitting time.

(7) What selects the substance of information is not a broadcasting station but receiving sets. A broadcasting station need not select information to be transmitted. This fact alleviates the duty of a broadcasting station, and the programs for transmission of a broadcasting station are greatly simplified.

(8) If information packets include distinction codes, the broadcasting station may transmit the same text more than once. Receiving sets thus have several chances to receive each information packet. This is particularly beneficial if the receiving set exists in an area with a low intensity of electric wave, for if the receiving set is out of order temporarily or if an electric wave is perturbed by thunder, the receiving set may fail to receive the first transmission of an information packet. In these cases, the receiving set can receive all necessary information during a later transmission.

What is claimed is:

1. A method for transmitting information over a system having at least one broadcasting station and a plurality of receivers, comprising the steps of:

composing information packets each of which includes a text portion including a sequence of words and symbols, a classification code signifying the type of text being transmitted and a distinction code indicating which of a plurality of repetitions a particular message is annexed to for each text portion;

converting the information packets into digital signals;

transmitting the digital signals representing said information packets at least once;

receiving the digital signal information packets at said receivers, each of which as preprogrammed therein at least one classification code, the at least one pre-programmed classification code at a particular receiver being changed, added as a new classification code or deleted by a user for signifying the type of text the user wishes to receive at said particular receiver;

selecting received information packets with a classification code corresponding to the pre-programmed classification code at each receiver;

selecting the information packets with a distinction code other than the distinction codes corresponding to already accumulated text portions so that duplication information is not received;

accumulating the selected information packets; and conveying to a user information corresponding to the text portions of the accumulated information packets by at least one of visually displaying said information and enunciating said information over a speaker at each receiver.

2. A method according to claim 1 wherein said step of composing comprises the step of composing information packets having a text portion where the text comprises sentences including at least one of the following types of characters: square forms of Japanese syllabary, alphabets, numerals, Chinese characters, pronunciation symbols, an accent symbol, a blank symbol, a period and comma.

3. A method according to claim 1 wherein said step of composing comprises the step of composing information packets having a text portion where the text comprises sentences including at least one of the following types of characters: square forms of Japanese syllabary, alphabets, numbers, an accent symbol, a blank symbol, a period and a comma.

4. A method according to claim 1 wherein said step composing comprises the step of composing information packets wherein the classification code comprises a symbol signifying a classification code and a sequence of a predetermined number of numerals.

5. A method according to claim 4 wherein said step of composing comprises the step of composing information packets wherein the classification code comprises a slash "/" and ten numerals succeeding the "/".

6. A method according to claim 1 wherein said step of composing comprises the step of composing information packets wherein the distinction code comprises a symbol signifying a distinction code and a sequence of a predetermined number of numerals.

7. A method according to claim 6 wherein said step of composing comprises the step of composing information packets wherein the distinction code comprises the symbol signifying a distinction code and a sequence of ten numerals indicating the year, month, day, o'clock, and minute of the time of obtaining the text portion of the information packet.

8. A method according to claim 6 wherein said step of composing comprises the step of composing information packets wherein the distinction code comprises the symbol signifying a distinction code and a sequence of sixteen numerals comprising ten numerals indicating the year, month, day, o'clock, and minute of the time of obtaining the text portion of the information packet, two numerals indicating a repetition number of transmission of the text portion of an information packet and four numerals indicating the tme of transmission.

9. A method according to claim 8 wherein said step of composing comprises the step of composing information packets wherein the symbol signifying a distinction code is a yen symbol "Y".

10. A method according to claim 1 wherein the step of transmitting comprises the step of transmitting via electric wire cables.

11. A method according to claim 1 wherein the step of transmitting comprises the step of transmitting via optical fiber cables.

12. A method according to claim 1 wherein the step of transmitting comprises the step of modulating a carrier wave with the digital signals representing said information packets, the binary values "0" and "1" being represented by the modulation of said carrier wave with two different frequencies.

13. A method according to claim 1 wherein said step of transmitting comprises the steps of transmitting by a first broadcasting station having a wide broadcasting area and transmitting by a second broadcasting station having a narrow broadcasting area using the same transmitting medium in turn by time multiplexing the digital signals representing said information packets for transmission.

14. A method for transmitting voice information from at least one broadcasting station to a plurality of receivers, comprising the steps of:

composing information packets each of which includes a text portion including a sequence of words and symbols and a classification code signifying a substance of the text portion;

converting the information packets into digital signals;

transmitting one time the information packets substantially as digital signals via a transmitting medium in succession;

receiving at at least one of said receivers having at least one classification code stored therein, said transmitted information packets, said stored classification codes being changed, added as a new classification code or deleted by a user for signifying the substance of the text portion the user wishes to receive;

selecting received information packets with a classification code corresponding to the stored classification code at said at least one receiver;

accumulating in said at least one receiver selected information packets having a classification code matching the classification code previously stored in said receiver; and conveying to a user information corresponding to the texts of the accumulated information packets by at least one of visually displaying said information and enunciating said information over a speaker at each receiver according to an output order determined by said at least one receiver.

15. A method according to claim 14 wherein the step of composing comprises the step of composing information packets wherein said text portion comprises at least one of the following types of characters: the square forms of Japanese syllabary, alphabets, numerals, Chinese character, pronunciation symbols, an accent symbol, a blank symbol a, period and comma.

16. A method according to claim 14 wherein the step of composing comprises the step of composing information packets with a classification code including a symbol signifying that the following data is part of a classification code, said following data comprising a sequence of a predetermined number of numerals.

17. A method according to claim 16 wherein the step of composing comprises the step of composing information packets wherein said classification code includes a slash "/" and ten numerals succeeding said "/".

18. A method according to claim 14 wherein said step of transmitting comprises the step of transmitting via electric wire cables.

19. A method according to claim 14 wherein said step of transmitting comprises the step of transmitting via optical fiber cables.

20. A method according to claim 14 wherein said step of transmitting comprises the step of modulating a carrier wave with the digital signals corresponding to said information packets, the binary values "0" and "1" being represented by the modulation of said carrier wave with two different frequencies.

21. A method according to claim 14 wherein said step of transmitting comprises the steps of transmitting by a first broadcasting station having a wide broadcasting area and transmitting by a second broadcasting station having a narrow broadcasting area by time multiplexing the digital signals corresponding to said information packets.

22. A method according to claim 1 wherein said step of conveying comprises the step of synthesizing a voice message from accumulated text portions.

23. A method according to claim 1 wherein said step of conveying comprises the step of displaying alphanumeric characters of said accumulated text portions.

24. A method according to claim 23 wherein said step of conveying comprises the step of displaying alphanumeric characters of said accumulated text portions.

25. A method according to claim 14 wherein said step of conveying comprises the step of synthesizing a voice message from accumulated text portions.

26. A method according to claim 14 wherein said step of conveying comprises the step of displaying alphanumeric characters of said accumulated text portions.

27. A method according to claim 26 wherein said step of conveying comprises the step of displaying alphanumeric characters of said accumulated text portions.

* * * * *